US011984620B2

(12) United States Patent
Okazaki

(10) Patent No.: US 11,984,620 B2
(45) Date of Patent: May 14, 2024

(54) BUS BAR MODULE

(71) Applicant: YAZAKI CORPORATION, Tokyo (JP)

(72) Inventor: Yutaro Okazaki, Kakegawa (JP)

(73) Assignee: YAZAKI CORPORATION, Tokyo (JP)

(*) Notice: Subject to any disclaimer, the term of this patent is extended or adjusted under 35 U.S.C. 154(b) by 227 days.

(21) Appl. No.: 17/183,232

(22) Filed: Feb. 23, 2021

(65) Prior Publication Data

US 2021/0273299 A1 Sep. 2, 2021

(30) Foreign Application Priority Data

Feb. 27, 2020 (JP) ................................ 2020-031889

(51) Int. Cl.
*H01M 50/505* (2021.01)
*H01M 50/507* (2021.01)
*H01R 25/16* (2006.01)

(52) U.S. Cl.
CPC ....... *H01M 50/505* (2021.01); *H01M 50/507* (2021.01); *H01R 25/161* (2013.01); *H01M 2220/20* (2013.01)

(58) Field of Classification Search
CPC .......................... H01M 50/505; H01M 50/507
See application file for complete search history.

(56) References Cited

U.S. PATENT DOCUMENTS

2013/0171495 A1 7/2013 Ogasawara et al.
2015/0125727 A1* 5/2015 Lui .................... H01M 10/486 429/90
2017/0141371 A1* 5/2017 Toshioka ........... H01M 50/209
2019/0355527 A1* 11/2019 Idota .................. H01M 50/298

FOREIGN PATENT DOCUMENTS

JP 2012-164591 A 8/2012
JP 2021-111502 A 8/2021

* cited by examiner

*Primary Examiner* — Milton I Cano
*Assistant Examiner* — Joshua P McClure
(74) *Attorney, Agent, or Firm* — KENEALY VAIDYA LLP

(57) ABSTRACT

There is provided a bus bar module including a case having a first divided case and a second divided case which are divided in an arrangement direction of electric cells. A female lock portion of the first divided case includes a locking frame provided with a gap spaced apart from an end surface of the first divided case. A male lock portion of the second divided case includes a pair of elastic arms, a support plate portion spanning end portions of the elastic arms between each other, a locking plate portion formed on the support plate portion and inserted into the gap of the female lock portion, and a lock claw provided on the locking plate portion and locking the locking frame by inserting the locking plate portion into the gap. The support plate portion of the male lock portion has slits at a side of the elastic arms.

11 Claims, 11 Drawing Sheets

50 22 21 21a 81 81a 72a 81a 81b 82 83 41 42 43 72a 74 G 71a 73 72 71 73 74 72 71a 23 50 21 79 21b 79 75 76 77 76 85 86 46 47 45

1
2
3
5
10
20
20A
20B
21
22
23
25
31A
31B
33A
33B
33C
35
36
50

10
20
20A
20B
21
22
23
31A
31B
33A
33B
33C
35
41
45
50
60
61
62
63

21
50
23
43
41
42
22
45
47
46
31B
31A 50
23
21
79
85
86
75
77
21b
76
43
41
42
74
72a
72
73
71
71a
G
22
21a
82
83
81a
81
81b
46
47
45

101A
101B
100
111
112
113
115
116
117
117a
119
103

BUS BAR MODULE

CROSS-REFERENCE TO RELATED APPLICATIONS

This application is based on and claims priority under 35 USC 119 from Japanese Patent Application No. 2020-031889 filed on Feb. 27, 2020, the contents of which are incorporated herein by reference.

TECHNICAL FIELD

The present disclosure relates to a bus bar module.

BACKGROUND ART

A power supply apparatus mounted on various vehicles such as an electric automobile that travels using an electric motor and a hybrid automobile that travels using an engine and an electric motor in combination has a bus bar module assembled on an upper portion of a battery assembly body including a plurality of electric cells. The bus bar module includes a plurality of bus bars electrically connected to electrodes of the plurality of electric cells. These bus bars are housed and held in a resin-made case attached to the upper portion of the battery assembly body (see, for example, JP2012-164591A).

Some bus bar modules include a case in which a plurality of divided cases are coupled to each other. In such a case, a coupling portion between the divided cases absorbs a tolerance of an arrangement pitch of electrodes of electric cells.

However, when the arrangement pitch of the electrodes of the electric cells that constitute the battery assembly body is narrowed, a space that can be secured for tolerance absorption at the coupling portion of the divided cases becomes small. Then, a tolerance cannot be sufficiently absorbed in the coupling portion of the divided cases, and it may be difficult to assemble the bus bar module to the battery assembly body.

SUMMARY OF INVENTION

The present disclosure provides a bus bar module that can sufficiently absorb a tolerance of electrodes of electric cells that constitute a battery assembly body and can be favorably assembled to the battery assembly body.

According to an aspect of the present disclosure, a bus bar module including: a case assembled to a battery assembly body including a plurality of electric cells; and a bus bar supported in the case and connected to electrodes of the electric cells of the battery assembly body. The case includes a coupling portion, a first divided case and a second divided case which are divided in an arrangement direction of the electric cells and coupled at the coupling portion, the coupling portion including a female lock portion provided at the first divided case and a male lock portion provided at the second divided case. The female lock portion includes a locking frame provided with a gap spaced apart from an end surface of the first divided case. The male lock portion includes a pair of elastic arms extending from an end surface of the second divided case and having at least two bending points, a support plate portion spanning end portions of the elastic arms between each other, a locking plate portion formed on the support plate portion and inserted into the gap of the female lock portion, and a lock claw provided on the locking plate portion and locking the locking frame by inserting the locking plate portion into the gap. The support plate portion of the male lock portion has slits at a side of the elastic arms.

The present disclosure has been briefly described above. Details of the present disclosure are further clarified by reading a mode for carrying out the disclosure (hereinafter, referred to as "embodiment") described below with reference to attached drawings.

DESCRIPTION OF EMBODIMENTS

Hereinafter, an example of an embodiment according to the present disclosure will be described with reference to the drawings.

Figure 1:
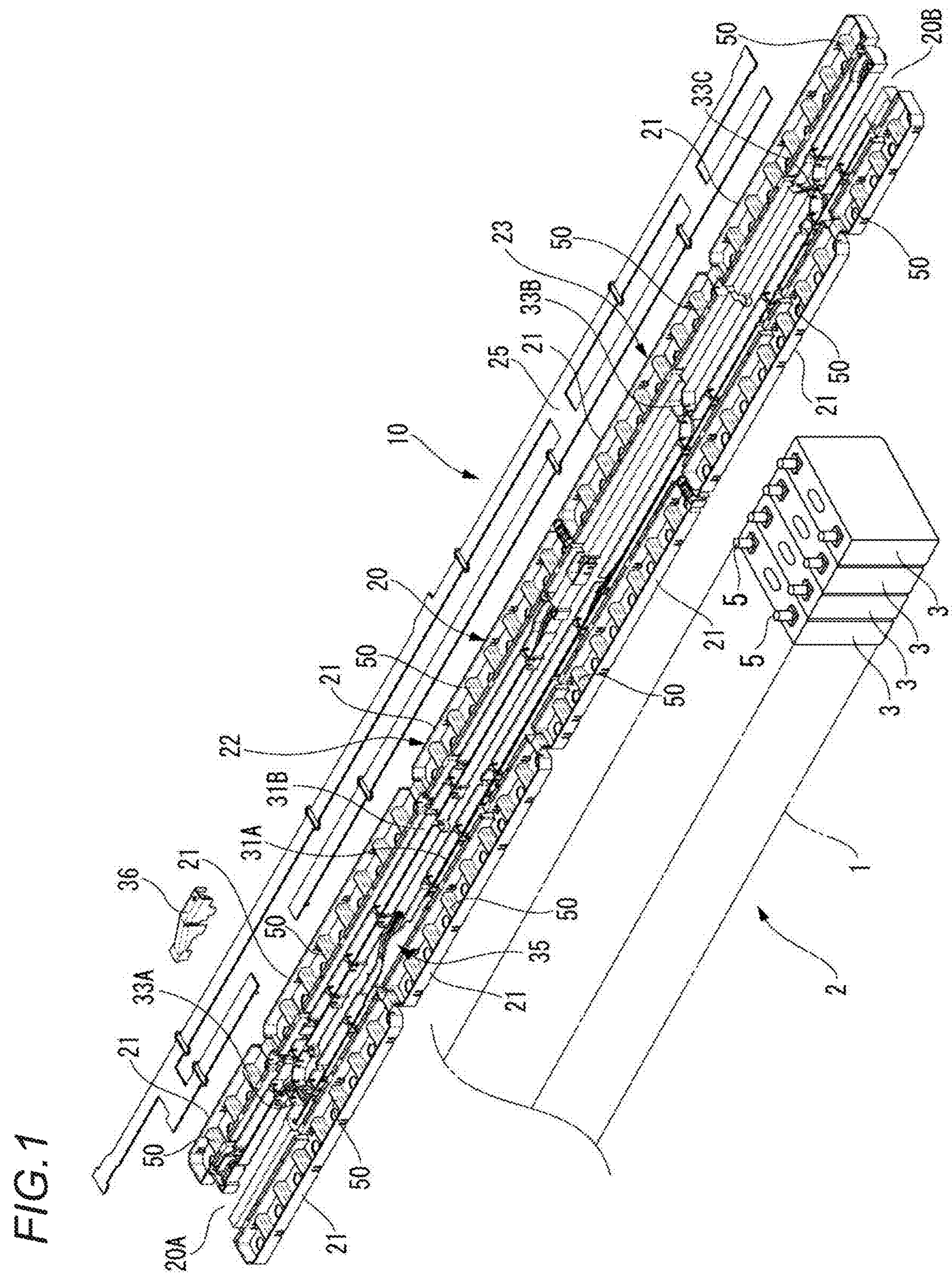
FIG. 1 is a perspective view of a bus bar module and a battery assembly body according to the present embodiment.

FIG. 1 is a perspective view of a bus bar module and a battery assembly body according to the present embodiment.

As shown in FIG. 1, a bus bar module 10 according to the present embodiment is assembled to an upper portion of a battery assembly body 1 to constitute a power supply apparatus 2. The power supply apparatus 2 is used by being mounted on various vehicles such as an electric automobile that travels using an electric motor and a hybrid automobile that travels using an engine and an electric motor in combination, and supplies power to the electric motor.

The battery assembly body 1 includes a plurality of electric cells 3 arranged in a row along one direction. Each electric cell 3 is formed in a rectangular parallelepiped shape, and includes a pair of electrodes 5 provided so as to protrude from one end and the other end of an upper surface, respectively. One of the pair of electrodes 5 is a positive electrode, and the other of the pair of electrodes 5 is a negative electrode.

In the battery assembly body 1, the plurality of (four in this example) electric cells 3 adjacent to each other are set as one set, and electrodes of the electrodes 5 are aligned. The bus bar module 10 connects sets of the electric cells 3 in series by bus bars 50 to be described later.

Figure 2:
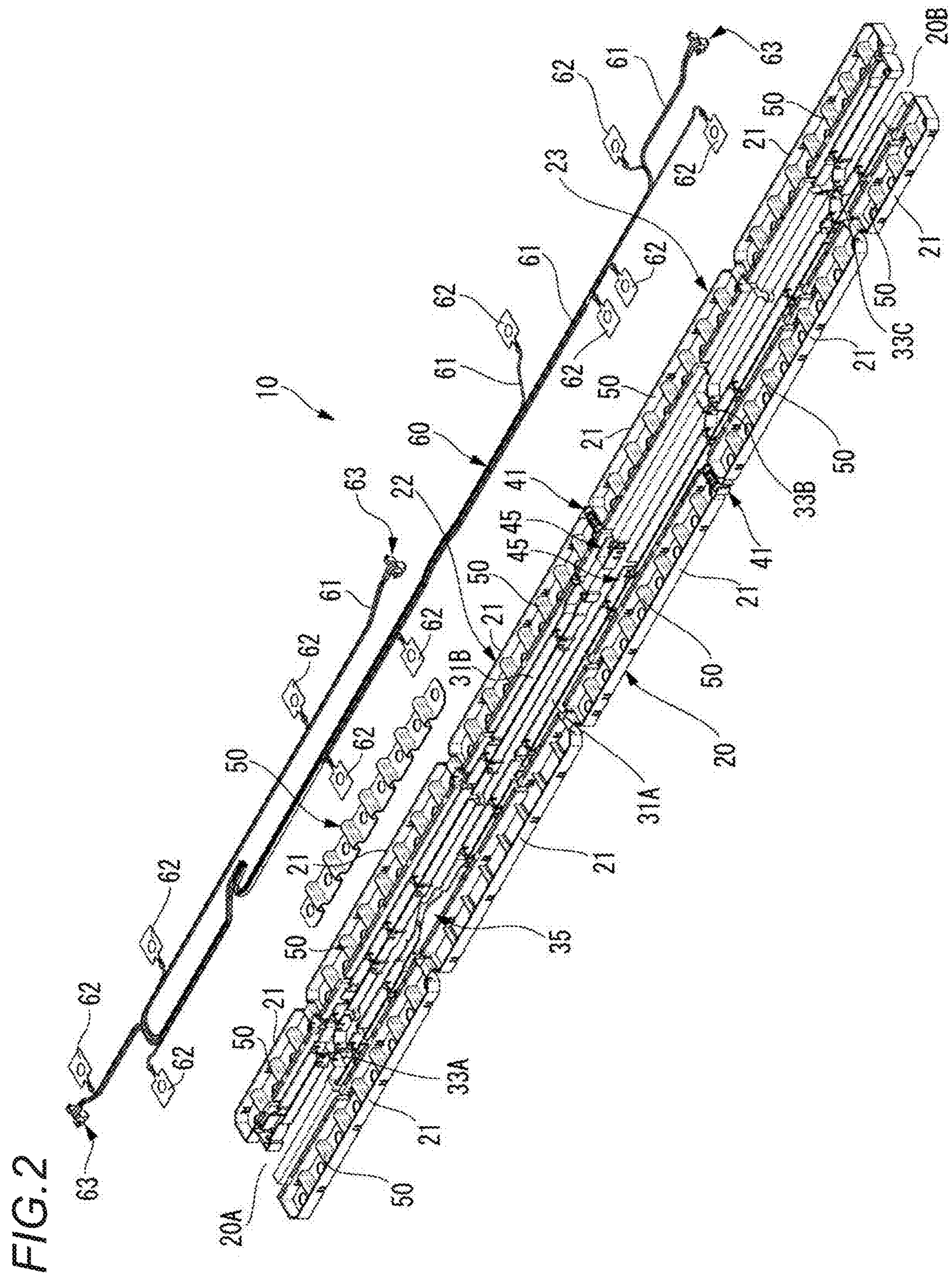
FIG. 2 is an exploded perspective view of the bus bar module according to the present embodiment.

FIG. 2 is an exploded perspective view of the bus bar module according to the present embodiment.

As shown in FIG. 2, the bus bar module 10 includes a case 20, the bus bars 50, and a wire harness 60 including a plurality of electric wires 61.

The case 20 is formed of, for example, an electrically insulating synthetic resin or the like, and includes a plurality of bus bar housing portions 21.

The bus bar housing portions 21 are arranged in two rows along an arrangement direction of the plurality of electric cells 3. The bus bar housing portion 21 is formed in a frame shape, and the bus bar 50 is housed in the bus bar housing portion 21.

A first electric wire routing groove portion 31A and a second electric wire routing groove portion 31B are provided between the two rows of bus bar housing portions 21. The first electric wire routing groove portion 31A and the second electric wire routing groove portion 31B are formed along the rows of the bus bar housing portions 21 in a longitudinal direction of the case 20. Further, a first electric wire bridge portion 33A, a second electric wire bridge portion 33B, and a third electric wire bridge portion 33C are provided between the first electric wire routing groove portion 31A and the second electric wire routing groove portion 31B.

The first electric wire bridge portion 33A is provided in the vicinity of one end 20A of the case 20, the second electric wire bridge portion 33B is provided in the middle of the case 20, and the third electric wire bridge portion 33C is provided in the vicinity of the other end 20B of the case 20. As shown in FIG. 1, a cover 25 is attached to the case 20 from above. When being attached to the case 20, the cover 25 covers the first electric wire routing groove portion 31A, the second electric wire routing groove portion 31B, the first electric wire bridge portion 33A, the second electric wire bridge portion 33B, and the third electric wire bridge portion 33C.

The case 20 includes an electric wire take-out portion 35. The electric wire take-out portion 35 is provided between the first electric wire bridge portion 33A and the second electric wire bridge portion 33B of the first electric wire routing groove portion 31A. An electric wire pressing cover 36 can be attached to the electric wire take-out portion 35 from above.

As shown in FIG. 2, the plurality of electric wires 61 that constitute the wire harness 60 are electric wires for voltage detection with connection terminals 62 connected to end portions, and electric wires for temperature measurement with thermistors 63 connected to the end portions. The connection terminals 62 are fastened together with the respective bus bars 50 to the electrodes 5 of the electric cells 3, and are electrically connected to the bus bars 50. Further, the thermistor 63 is in contact with a specific electric cell 3 of the battery assembly body 1 to measure a temperature of the electric cell 3. In the wire harness 60, the electric wires 61 are connected to a control circuit substrate (not shown) including a voltage monitoring circuit and a temperature monitoring circuit.

The electric wires 61 of the wire harness 60 are housed and routed in the first electric wire routing groove portion 31A, the second electric wire routing groove portion 31B, the first electric wire bridge portion 33A, the second electric wire bridge portion 33B, and the third electric wire bridge portion 33C. Then, the electric wires 61 are pulled out to an outside from the electric wire take-out portion 35 provided in the first electric wire routing groove portion 31A.

The case 20 that constitutes the bus bar module 10 is divided at a substantially middle portion in the longitudinal direction. Accordingly, the case 20 includes two divided cases 22 and 23 divided in the longitudinal direction. These divided cases 22 and 23 are coupled to each other to constitute the case 20. These divided cases 22 and 23 may be called as a first divided case 22 and a second divided case 23, respectively. Hereinafter, it is referred to as the divided cases 22 and 23.

Next, a coupling structure between the divided cases 22 and 23 will be described.

Figure 3:
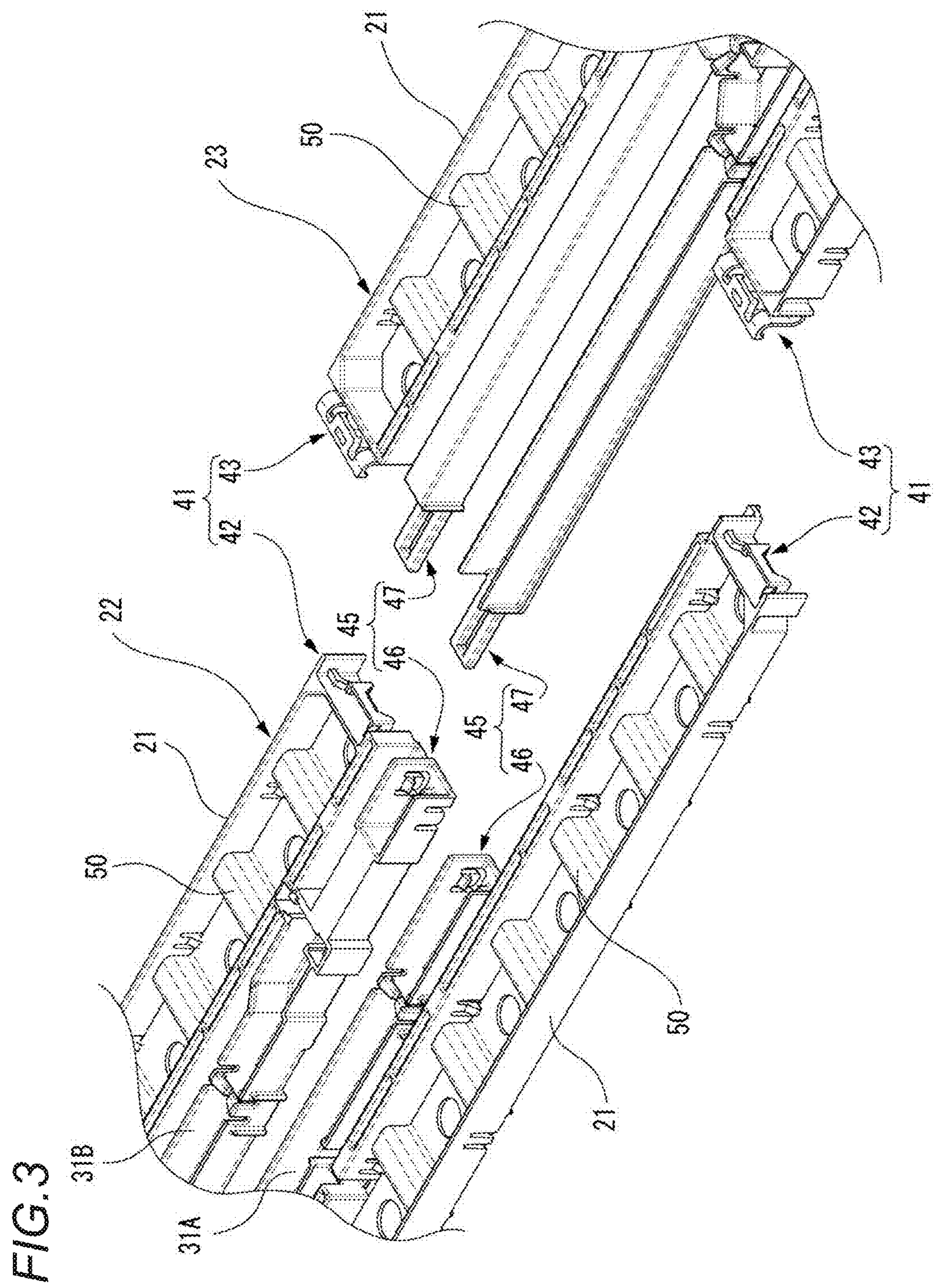
FIG. 3 is a perspective view of coupling locations between divided cases.
Figure 4:
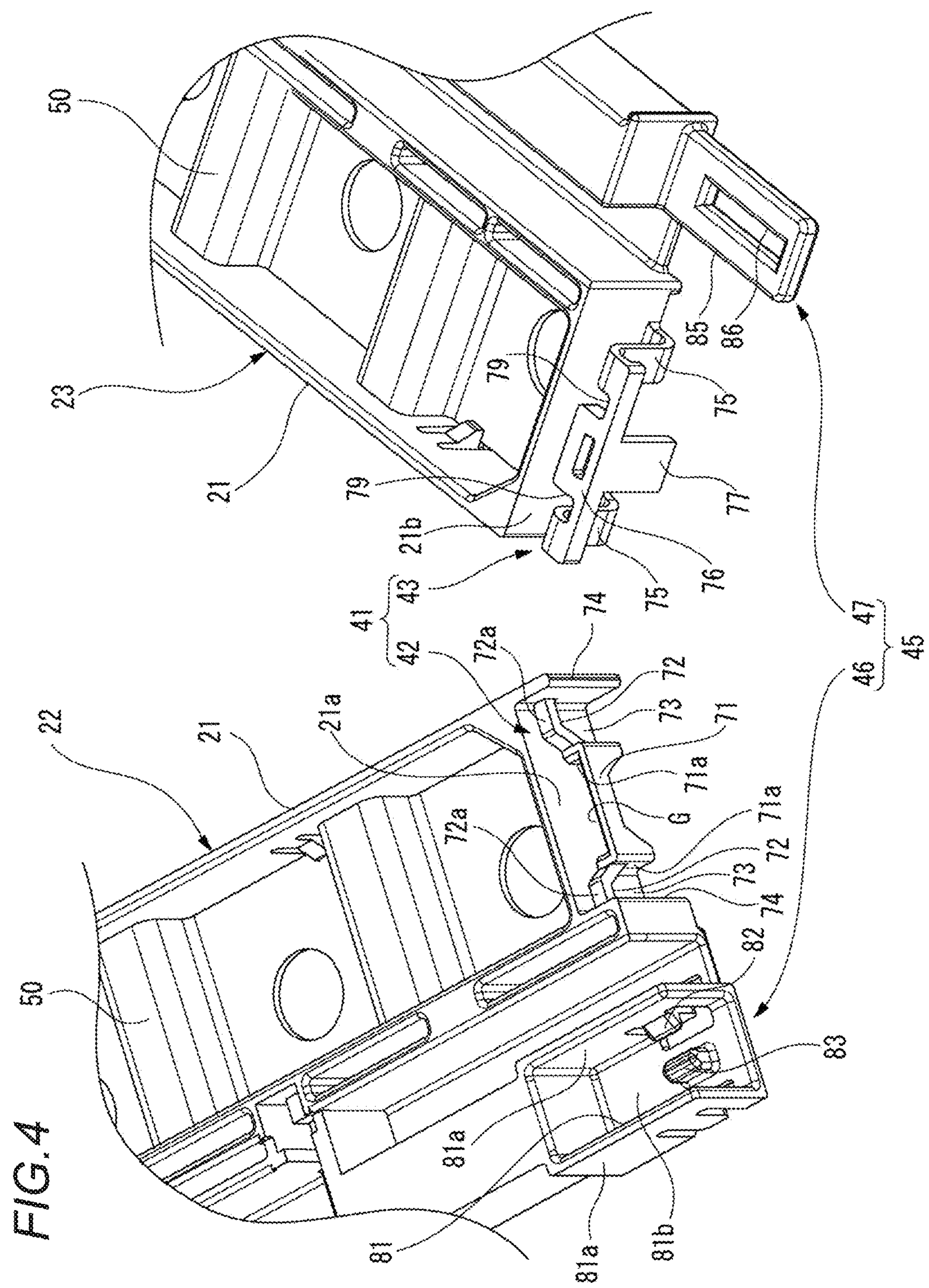
FIG. 4 is a perspective view of a first coupling portion and a second coupling portion of the divided cases.
Figure 5A:
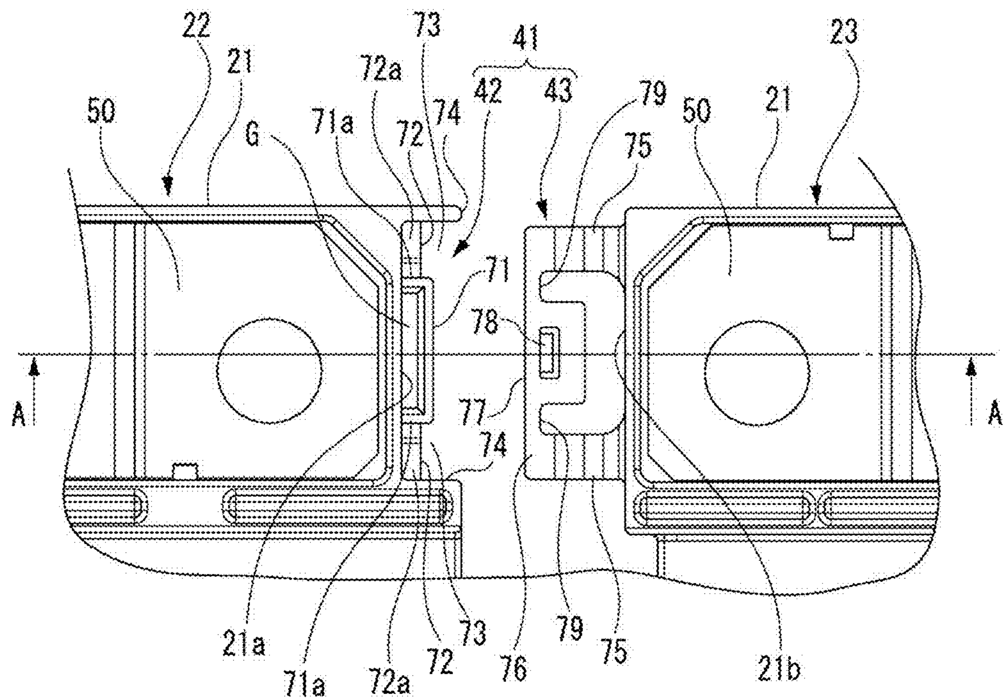
FIG. 5A is a plan view showing a female lock portion and a male lock portion that constitute the first coupling portion of the divided cases.
Figure 5B:
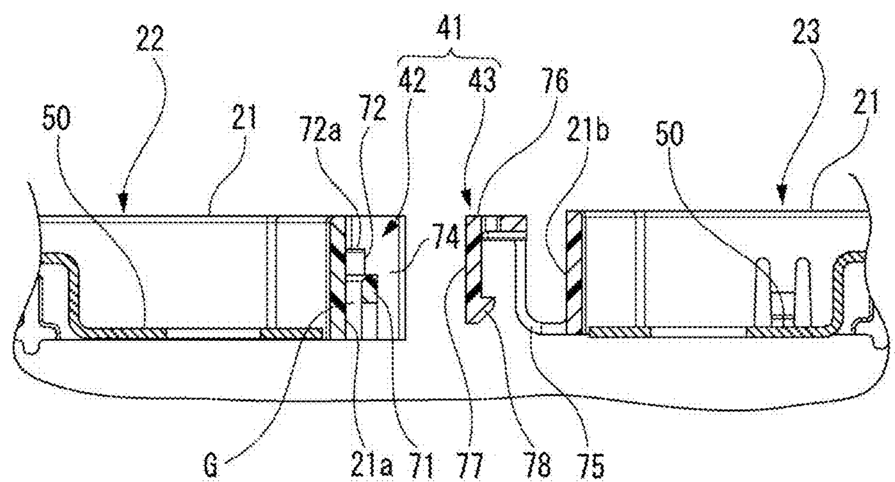
FIG. 5B is a cross-sectional view taken along a line A-A in FIG. 5A.

FIG. 3 is a perspective view of coupling locations between the divided cases. FIG. 4 is a perspective view of a first coupling portion and a second coupling portion of the divided cases. FIGS. 5A and 5B are views showing a female lock portion and a male lock portion that constitute the first coupling portion of the divided cases. FIG. 5A is a plan view, and FIG. 5B is a cross-sectional view taken along a line A-A in FIG. 5A.

As shown in FIG. 3, the divided cases 22 and 23 coupled to each other include first coupling portions 41 and second coupling portions 45.

The first coupling portion 41 includes a female lock portion 42 provided at an end portion of the bus bar housing portion 21 of one divided case 22 and a male lock portion 43 provided at an end portion of the bus bar housing portion 21 of the other divided case 23.

As shown in FIGS. 4, 5A, and 5B, the female lock portion 42 is provided on an end surface 21*a* of the bus bar housing portion 21 of one divided case 22. The female lock portion 42 includes a locking frame 71. Both end portions of the locking frame 71 are supported by the end surface 21*a* via fixing portions 71*a*, the locking frame 71 is formed in a box shape in which an upper portion is opened, and the locking frame 71 is disposed in parallel to the end surface 21*a* with a gap G. Further, the end surface 21*a* includes support portions 72 on both sides of the locking frame 71. These support portions 72 protrude from the end surface 21*a*, and upper surfaces of the support portions 72 are abutment surfaces 72*a* formed of horizontal surfaces. Further, the female lock portion 42 includes housing recesses 73 on lower sides of the support portions 72 on both sides of the locking frame 71. The housing recesses 73 are provided at positions facing elastic arms 75 of the male lock portion 43, which will be described later, when the housing recesses 73 are coupled to the male lock portion 43. Further, the female lock portion 42 includes side walls 74 on both side portions thereof.

The male lock portion 43 is provided on an end surface 21*b* of the bus bar housing portion 21 of the other divided case 23. The male lock portion 43 includes the pair of elastic arms 75 formed in a belt shape. One end of the elastic arm 75 is continuously provided to a vicinity of a lower end of the end surface 21*b*. The elastic arms 75 are bent upward at a first bending point 75*a* from one end side and are extended, and the other ends are bent at a second bending point 75*b* in a direction away from the end surface 21*b*. The other ends of these elastic arms 75 are continuously provided to a support plate portion 76. The support plate portion 76 is supported by the elastic arms 75 and is disposed along a horizontal direction. A locking plate portion 77 that extends downward is integrally formed at a middle portion of the support plate portion 76. A lock claw 78 protrudes from a surface of the locking plate portion 77 on an end surface 21*b* side at a lower end of the locking plate portion 77. Further, a pair of slits 79 are formed in the support plate portion 76 of the male lock portion 43. These slits 79 are formed on an elastic arm 75 side. Accordingly, in the male lock portion 43, since the slits 79 are provided between the locking plate portion 77 and the elastic arms 75, the elastic arms 75 are arranged at positions away from the locking plate portion 77.

As shown in FIGS. 3 and 4, the second coupling portion 45 includes female lock portions 46 provided at end portions of the first electric wire routing groove portion 31A and the second electric wire routing groove portion 31B of one divided case 22, and male lock portions 47 provided at end portions of the first electric wire routing groove portion 31A and the second electric wire routing groove portion 31B of the other divided case 23.

The female lock portion 46 includes an engagement recess 81 open upward and forward. Locking claws 82 that protrude inward are formed on both side walls 81*a* of the engagement recess 81. Further, an engagement protrusion 83 that protrudes upward is formed on a bottom wall 81*b* of the engagement recess 81.

The male lock portion 47 includes an engagement plate portion 85 formed in a flat plate shape. The engagement plate portion 85 has a width dimension that allows the engagement plate portion 85 to be fitted into the engagement recess 81 of the female lock portion 46. An engagement hole portion 86 formed of a long hole is formed along a longitudinal direction in a central portion in a width direction of the engagement plate portion 85.

Next, a case where the case 20 is formed by coupling the divided cases 22 and 23 to each other will be described.

Figure 6A:
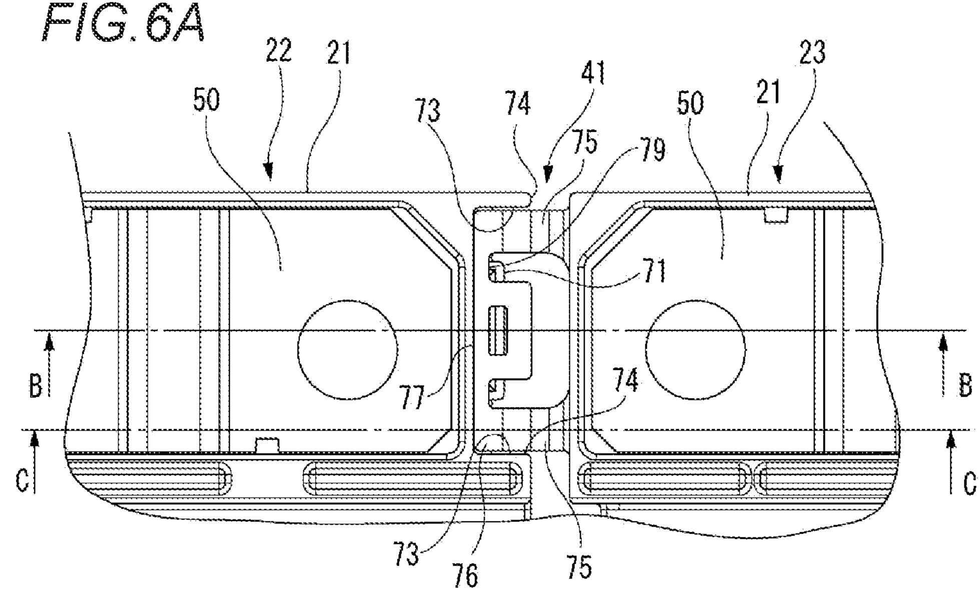
FIG. 6A is a plan view showing the female lock portion and the male lock portion that constitute the first coupling portion of the divided cases in a coupled state.
Figure 6B:
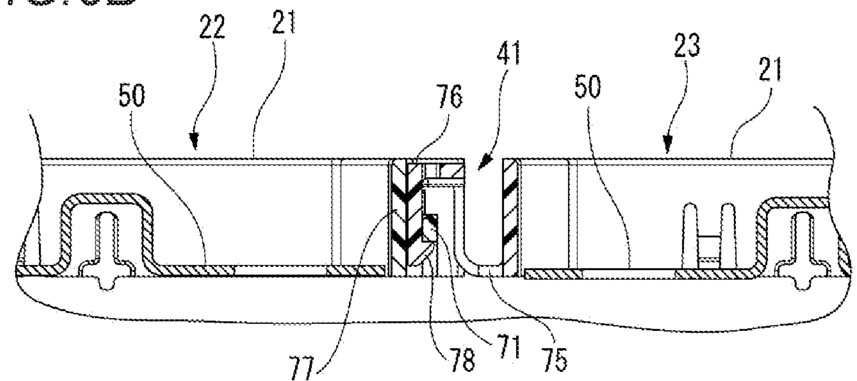
FIG. 6B is a cross-sectional view taken along a line B-B in FIG. 6A.
Figure 6C:
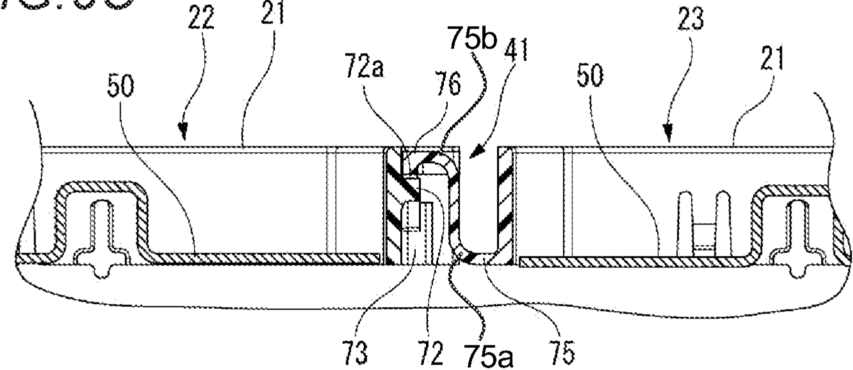
FIG. 6C is a cross-sectional view taken along a line C-C in FIG. 6A.
Figure 7:
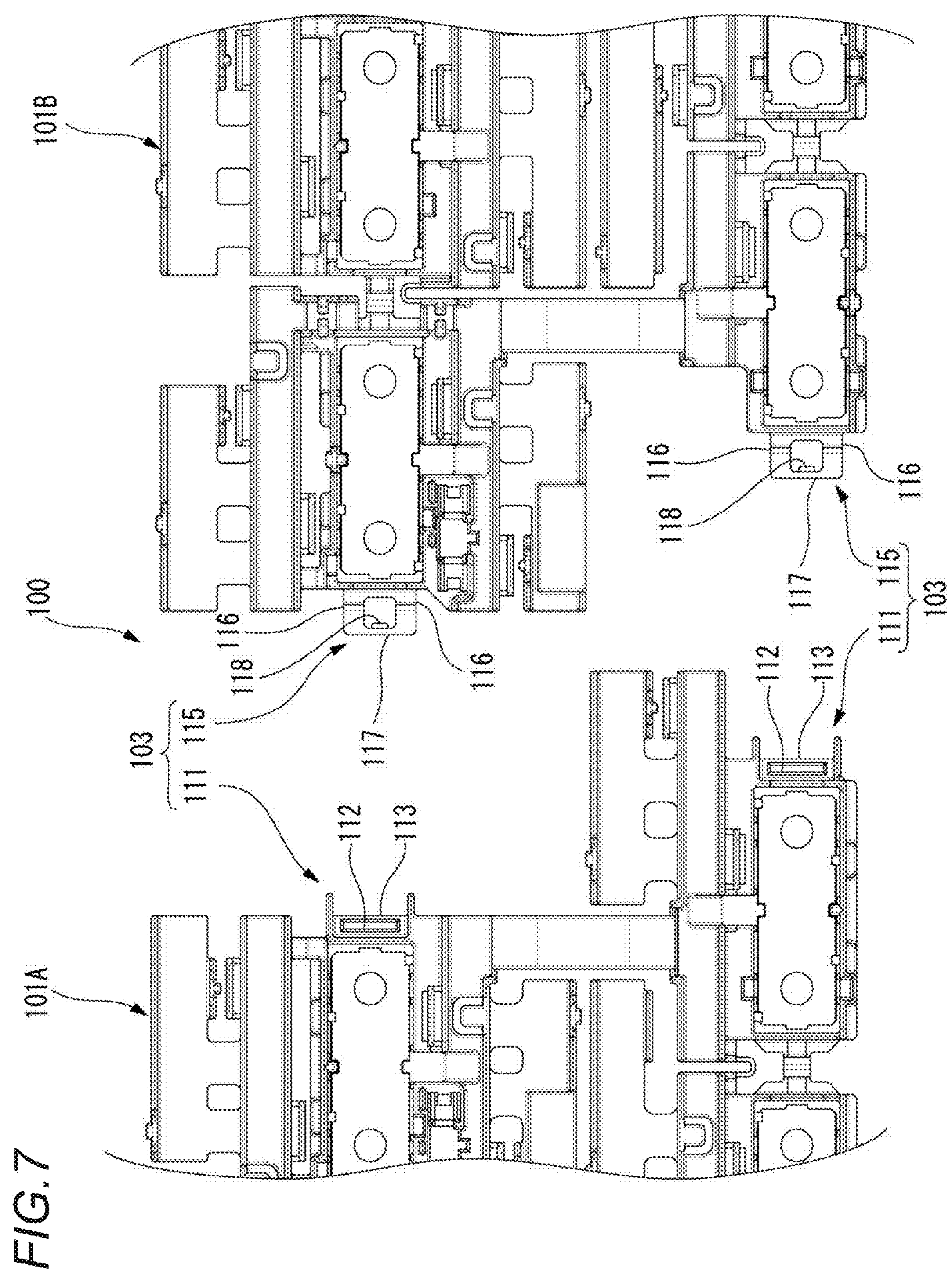
FIG. 7 is a plan view of coupling locations between divided cases that constitute a case of a bus bar module according to a reference example.
Figure 8:
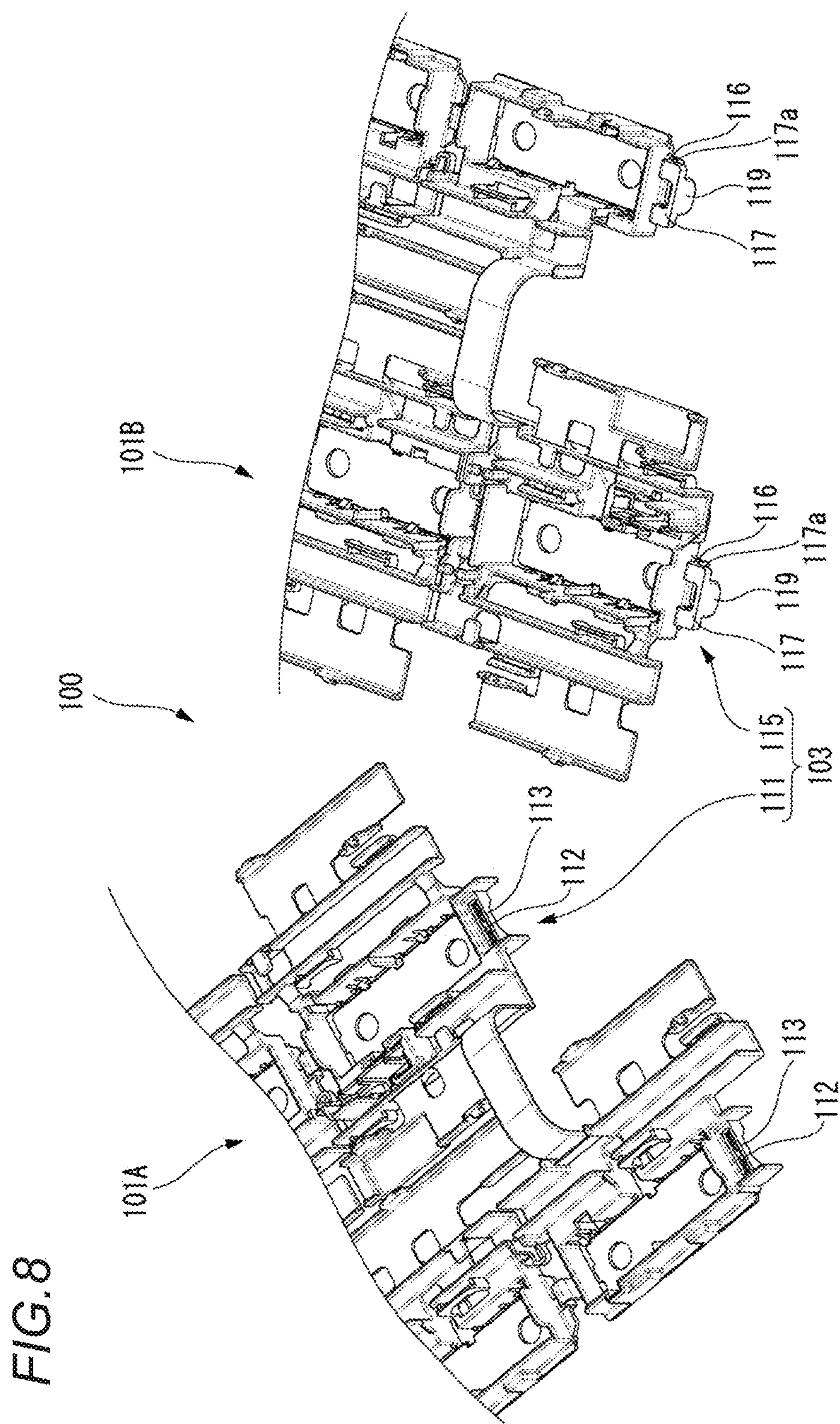
FIG. 8 is a perspective view of the coupling locations between the divided cases that constitute the case of the bus bar module according to the reference example.
Figure 9A:
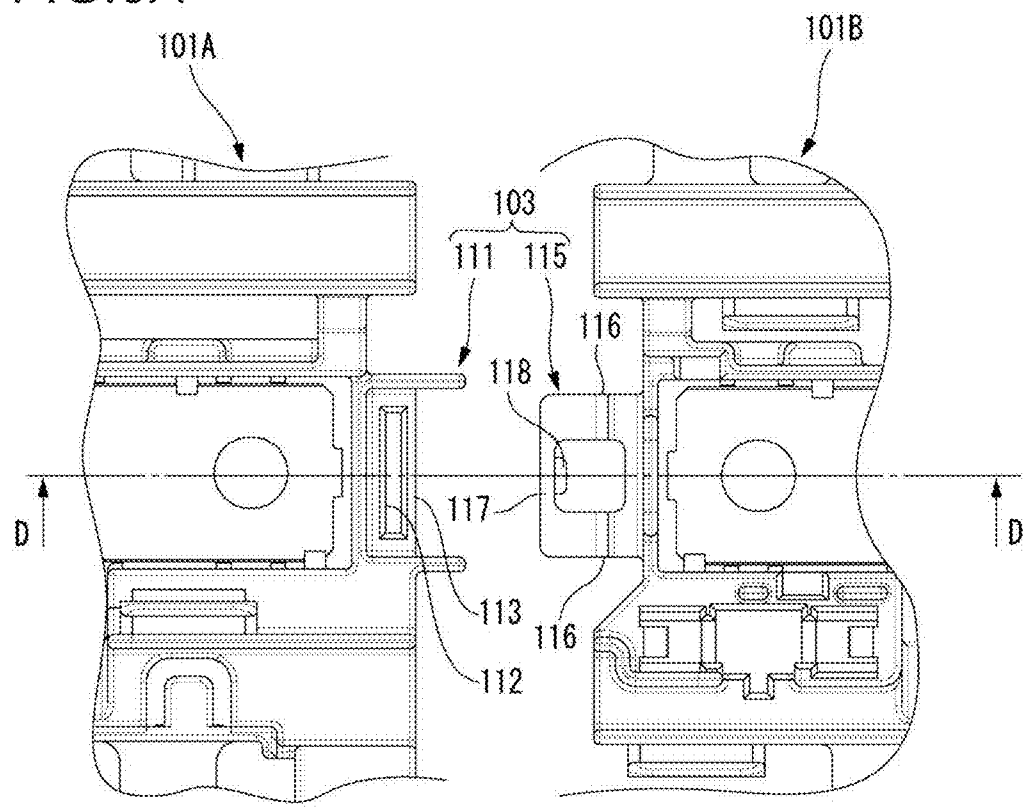
FIG. 9A is a plan view showing a female lock portion and a male lock portion that constitute a coupling portion in the reference example.
Figure 9B:
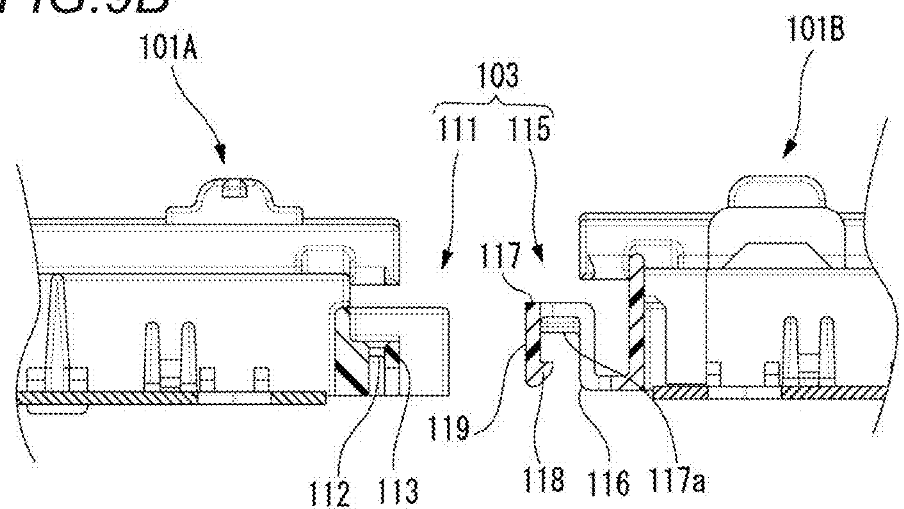
FIG. 9B is a cross-sectional view taken along a line D-D in FIG. 9A.

FIGS. 6A to 6C are views showing the female lock portion and the male lock portion that constitute the first coupling portion of the divided cases in a coupled state. FIG. 6A is a plan view. FIG. 6B is a cross-sectional view taken along a line B-B in FIG. 6A, and FIG. 6C is a cross-sectional view taken along a line C-C in FIG. 6A.

In order to couple the divided cases 22 and 23 to each other, the female lock portion 42 and the male lock portion 43 of the first coupling portion 41 are engaged with each other, and the female lock portion 46 and the male lock portion 47 of the second coupling portion 45 are engaged with each other.

As shown in FIGS. 6A, 6B, and 6C, in the first coupling portion 41, the locking plate portion 77 of the male lock portion 43 is inserted into the gap G between the end surface 21*a* and the locking frame 71 of the female lock portion 42 from above. Then, the lock claw 78 of the locking plate portion 77 inserted into the gap G locks a lower edge of the locking frame 71. Accordingly, the female lock portion 42 and the male lock portion 43 are engaged with each other. In this engaged state, the support plate portion 76 of the male lock portion 43 abuts against the abutment surface 72*a* of the support portion 72 of the female lock portion 42. Further, the elastic arms 75 of the male lock portion 43 are arranged at positions facing the housing recesses 73 of the female lock portion 42. Further, in a state where the lock claw 78 of the locking plate portion 77 of the male lock portion 43 is locked to the locking frame 71 of the female lock portion 42, the male lock portion 43 is fitted between the side walls 74 of the female lock portion 42.

In the second coupling portion 45, the engagement plate portion 85 of the male lock portion 47 is fitted into the engagement recess 81 of the female lock portion 46 from above. Then, the engagement protrusion 83 is inserted into the engagement hole portion 86 of the engagement plate portion 85 fitted into the engagement recess 81, and both side portions of the engagement plate portion 85 are locked by the locking claws 82. In this state, the engagement plate portion 85 is fitted between the side walls 81*a* of the engagement recess 81.

Accordingly, the divided cases 22 and 23 are coupled to each other by the first coupling portion 41 and the second coupling portion 45 to form the case 20.

Here, a bus bar module according to a reference example will be described.

As shown in FIGS. 7, 8, 9A, and 9B, in a bus bar module 100 according to the reference example, divided cases 101A and 101B are coupled to each other by a pair of coupling portions 103 arranged in a width direction.

The coupling portion 103 includes a female lock portion 111 provided at an end portion of one divided case 101A and a male lock portion 115 provided at an end portion of the other divided case 101B.

Figure 10:
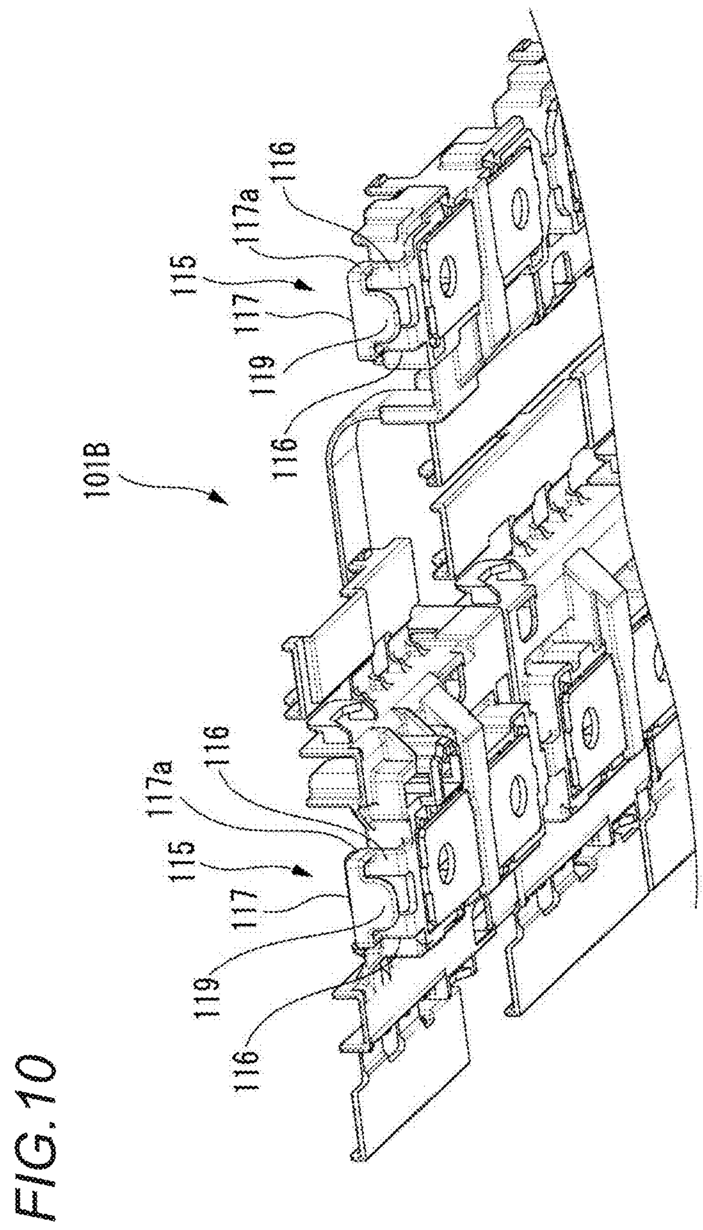
FIG. 10 is a perspective view seen from a lower side of the male lock portion that constitutes the coupling portion in the reference example.

The female lock portion III includes a coupling plate portion 113 including a long hole 112, on an end surface of one divided case 101A. The male lock portion 115 includes a pair of elastic arms 116 that extend from an end surface of the other divided case 101B. As shown in FIG. 10, a support portion 117 including a peripheral wall 117*a* is continuously provided at a tip end of the elastic arm 116, and a locking plate portion 119 including a locking claw 118 protrudes downward from the support portion 117.

Figure 11A:
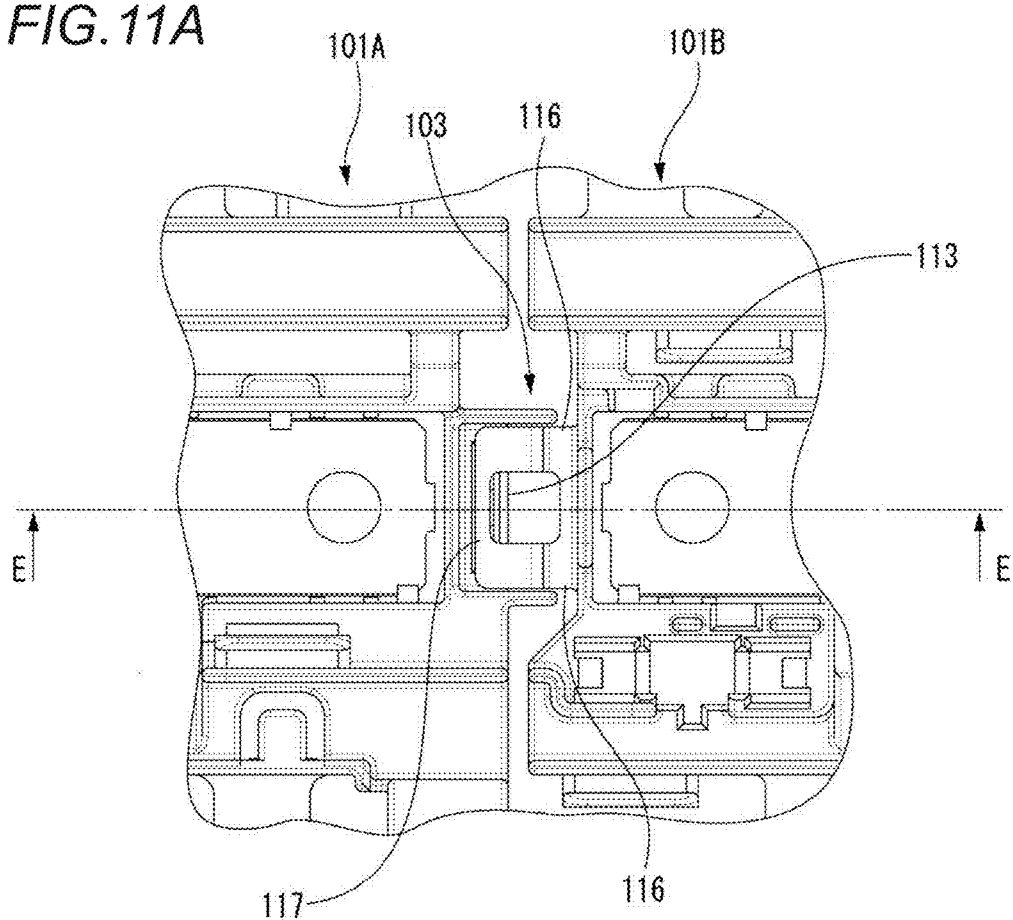
FIG. 11A is a plan view showing the female lock portion and the male lock portion that constitute the coupling portion of the divided cases in a coupled state in the reference example.
Figure 11B:
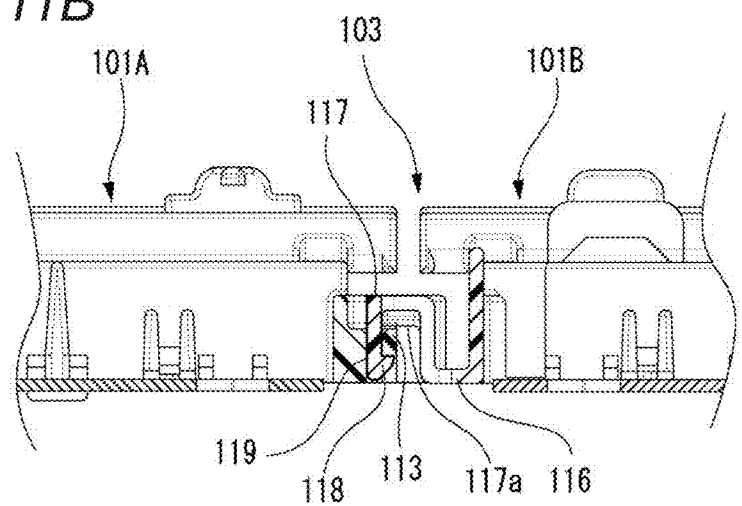
FIG. 11B is a cross-sectional view taken along a line E-E in FIG. 11A.

As shown in FIGS. 11A and 11B, in the coupling portion 103, the locking plate portion 119 of the male lock portion 115 is inserted into the long hole 112 of the coupling plate portion 113 of the female lock portion 111, so that the locking claw 118 of the locking plate portion 119 locks an edge portion of the long hole 112 of the coupling plate portion 113. Accordingly, the female lock portion 111 and the male lock portion 115 are engaged with each other, and the divided cases 101A and 101B are coupled to each other.

In the bus bar module 100 according to the reference example, in the male lock portion 115, the locking plate portion 119 including the locking claw 118 is provided on the support portion 117 including the peripheral wall 117*a*. Therefore, the male lock portion 115 has high rigidity, and tolerance absorbing performance of the coupling portion 103 is not good. Further, in the male lock portion 115, the elastic arms 116 provided adjacent to the locking plate portion 119 abut against the coupling plate portion 113 of the female lock portion 111, and thus elastic deformation is restricted. Therefore, it is difficult for the coupling portion 103 to sufficiently absorb a tolerance.

Therefore, in the bus bar module 100 according to the reference example, when an arrangement pitch of the electrodes 5 of the electric cells 3 that constitute the battery assembly body 1 is narrowed, and thus a space that can be secured for tolerance absorption of the coupling portion 103 is reduced, a tolerance cannot be sufficiently absorbed in the coupling portion 103, and it may be difficult to assemble the bus bar module 100 to the battery assembly body 1.

On the contrary, according to the bus bar module 10 of the present embodiment, the slits 79 are formed in the support plate portion 76 of the male lock portion 43 of the first coupling portion 41 on the elastic arm 75 side of the locking plate portion 77. Therefore, rigidity of the support plate portion 76 of the male lock portion 43 can be reduced. Accordingly, a tolerance of an arrangement pitch of the electrodes 5 of the electric cells 3 can be sufficiently absorbed in the first coupling portions 41 of the divided cases 22 and 23, and the bus bar module 10 can be favorably and smoothly assembled to the battery assembly body 1.

Further, the female lock portion 42 includes the housing recesses 73 that can house the elastically deformed elastic arms 75 at the positions facing the elastic arms 75 on both sides of the locking frame 71. Here, in the male lock portion 43, the slits 79 are provided between the locking plate portion 77 and the elastic arms 75, so that the elastic arms 75 are arranged at the positions away from the locking plate portion 77. Accordingly, in the female lock portion 42, the housing recesses 73 can be easily provided at the positions facing the elastic arms 75 on both sides of the locking frame 71. Then, by providing the housing recesses 73 in the female lock portion 42, when the elastic arms 75 are elastically deformed toward a female lock portion 42 side, the elastic arms 75 are housed in the housing recesses 73. Therefore, it is possible to expand an absorption range of a tolerance at the first coupling portions 41 between the divided cases 22 and 23, and it is possible to more favorably and smoothly assemble the bus bar module 10 to the battery assembly body 1.

Further, when the lock claw 78 of the locking plate portion 77 of the male lock portion 43 is locked to the locking frame 71 of the female lock portion 42, the support plate portion 76 of the male lock portion 43 abuts against the abutment surfaces 72*a* of the female lock portion 42. Accordingly, it is possible to prevent twisting between the divided cases 22 and 23 with the longitudinal direction as an axis, and it is possible to more favorably assemble the bus bar module 10 to the battery assembly body 1.

The second coupling portion 45 is provided at a position adjacent to the first coupling portion 41 in a width direction of the case 20. Accordingly, the second coupling portion 45 is disposed at a position close to the first coupling portion 41, and twisting of the divided cases 22 and 23 in a planar direction in the first coupling portion 41 that couples the bus bar housing portions 21 to each other can be effectively prevented by the second coupling portion 45. Therefore, it is possible to prevent a positional deviation of the bus bars 50 housed in the bus bar housing portions 21 with respect to the electrodes 5 of the electric cells 3 that constitute the battery assembly body 1, and thus it is possible to favorably and smoothly assemble the bus bar module 10 to the battery assembly body 1.

Further, in the first coupling portion 41, the male lock portion 43 is fitted between the side walls 74 of the female lock portion 42, and in the second coupling portion 45, the male lock portion 47 is fitted between the side walls 81*a* of the female lock portion 46. Accordingly, if the divided cases 22 and 23 are twisted in the planar direction, the male lock portion 43 abuts against the side walls 74, and the male lock portion 47 abuts against the side walls 81*a*, so that the twisting of the divided cases 22 and 23 in the planar direction is prevented. Therefore, the bus bar module 10 can be more favorably assembled to the battery assembly body 1.

The present disclosure is not limited to the above-described embodiment, but may be appropriately modified, improved or the like. In addition, respective configuration elements of the embodiments are arbitrary and not limited in view of a material, a shape, a dimension, a quantity, an arrangement location, or the like, so long as the present disclosure can be achieved.

According to a first aspect of the present disclosure, a bus bar module (10) including: a case (20) assembled to a battery assembly body (1) including a plurality of electric cells (3); and a bus bar (50) supported in the case (20) and connected to electrodes (5) of the electric cells (3) of the battery assembly body (1). The case (20) includes a coupling portion (a first coupling portion 41), a first divided case (22) and a second divided case (23) which are divided in an arrangement direction of the electric cells (3) and coupled at the coupling portion (the first coupling portion 41), the coupling portion (the first coupling portion 41) including a female lock portion (42) provided at the first divided case (22) and a male lock portion (43) provided at the second divided case (23). The female lock portion (42) includes a locking frame (71) provided with a gap (G) spaced apart from an end surface (21*a*) of the first divided case (22). The male lock portion (43) includes a pair of elastic arms (75) extending from an end surface (21*b*) of the second divided case (23) and having at least two bending points (75*a*, 75*b*), a support plate portion (76) spanning end portions of the elastic arms (75) between each other, a locking plate portion (77) formed on the support plate portion (76) and inserted into the gap (G) of the female lock portion (42), and a lock claw (78) provided on the locking plate portion (77) and locking the locking frame (71) by inserting the locking plate portion (77) into the gap (G). The support plat portion (76) of the male lock portion (43) has slits (79) at a side of the elastic arms (75).

According to the bus bar module of the first aspect, the locking plate portion of the male lock portion is inserted into the gap between the end surface and the locking frame of the female lock portion, so that the lock claw of the locking plate portion locks the locking frame. Accordingly, the divided cases can be easily coupled to each other by the coupling portion including the female lock portion and the male lock portion. Further, the slits are formed in the support plate portion of the male lock portion on the elastic arm side of the locking plate portion. Therefore, rigidity of the support plate portion of the male lock portion can be reduced. Accordingly, a tolerance of an arrangement pitch of the electrodes of the electric cells can be sufficiently absorbed by the coupling portion between the divided cases, and the bus bar module can be favorably and smoothly assembled to the battery assembly body.

According to a second aspect of the present disclosure, the female lock portion (42) includes housing recesses (73) being capable of housing the elastic arms (75) deformed elastically at positions in both sides of the locking frame (71) at which the housing recesses (73) and the elastic arms (75) face with each other.

According to the bus bar module of the second aspect, when the elastic arms are elastically deformed toward a female lock portion side, the elastic arms are housed in the housing recesses provided at the positions facing the elastic arms on both sides of the locking frame of the female lock portion. Accordingly, it is possible to expand an absorption range of a tolerance at the coupling portion between the divided cases, and it is possible to more favorably and smoothly assemble the bus bar module to the battery assembly body.

According to a third aspect of the present disclosure, the female lock portion (42) includes an abutment surface (72*a*)

against which the support plate portion (76) of the male lock portion (43) abuts in a state where the lock claw (78) locks the locking frame (71).

According to the bus bar module of the third aspect, when the lock claw of the locking plate portion of the male lock portion is locked to the locking frame of the female lock portion, the support plate portion of the male lock portion abuts against the abutment surface of the female lock portion. Accordingly, it is possible to prevent twisting between the divided cases with a longitudinal direction as an axis, and it is possible to more favorably assemble the bus bar module to the battery assembly body.

According to a fourth aspect of the present disclosure, the coupling portion is a first coupling portion (41) provided between bus bar housing portions (21) in which the bus bar (50) is housed. The case (20) further includes a second coupling portion (45) in which a male lock portion (47) is engaged with a female lock portion (46) between electric wire routing groove portions (a first electric wire routing groove portion 31A. and a second electric wire routing groove portion 31B) in which an electric wire (61) is routed. The second coupling portion (45) is provided at a position adjacent to the first coupling portion (41) in a width direction of the case (20).

According to the bus bar module of the fourth aspect, the second coupling portion that couples the electric wire routing groove portions to each other is provided at the position adjacent to the first coupling portion that couples the bus bar housing portions of the divided cases to each other in the width direction of the case. Accordingly, the second coupling portion is disposed at a position close to the first coupling portion, and in the first coupling portion that couples the bus bar housing portions to each other, it is possible to effectively prevent twisting of the divided cases in a planar direction by the second coupling portion. Therefore, it is possible to prevent a positional deviation of the bus bars housed in the bus bar housing portions with respect to the electrodes of the electric cells that constitute the battery assembly body, and thus it is possible to favorably and smoothly assemble the bus bar module to the battery assembly body.

According to a fifth aspect of the present disclosure, in at least one of the first coupling portion (41) and the second coupling portion (45), the female lock portion (42, 46) includes side walls (74, 81*a*) facing each other and spaced apart in the width direction of the case (20), and the male lock portion (43, 47) is fitted between the side walls (74, 81*a*) of the female lock portion (42, 46).

According to the bus bar module of the fifth aspect, the male lock portion is fitted between the side walls provided at the female lock portion. Accordingly, it is possible to prevent the twisting of the divided cases in the planar direction, and it is possible to more favorably assemble the bus bar module to the battery assembly body.

According to the present disclosure, it is possible to provide a bus bar module that can sufficiently absorb a tolerance of electrodes of electric cells that constitute a battery assembly body and can be favorably assembled to the battery assembly body.

What is claimed is:

1. A bus bar module comprising:

a case assembled to a battery assembly body including a plurality of electric cells; and a bus bar supported in the case and connected to electrodes of the electric cells of the battery assembly body, wherein the case includes a coupling portion, a first divided case and a second divided case which are divided in an arrangement direction of the electric cells and coupled at the coupling portion, the coupling portion including a female lock portion provided at the first divided case and a male lock portion provided at the second divided case, wherein the female lock portion includes a locking frame spaced apart from an end surface of the first divided case in the arrangement direction and a gap extending between the end surface and the locking frame, wherein the male lock portion includes, a pair of elastic arms extending from an end surface of the second divided case in the arrangement direction, each of the elastic arms having an end portion and at least two bending points, a support plate portion, the support plate portion extending from both end portions of the elastic arms and spanning between the elastic arms, a locking plate portion formed on the support plate portion and inserted into the gap of the female lock portion, and a lock claw protruding from the locking plate portion and engaging the locking frame, wherein the support plate portion of the male lock portion has slits at a side of the elastic arms, wherein the locking plate portion protrudes from the support plate portion in a direction that intersects the arrangement direction, wherein the lock claw protrudes from the locking plate portion and toward the end surface of the second divided case in the arrangement direction, and wherein both bending points are located between the support plate portion and the end surface of the second divided case in the arrangement direction.

2. The bus bar module according to claim 1, wherein the female lock portion includes housing recesses being capable of housing the elastic arms deformed elastically at positions in both sides of the locking frame at which the housing recesses and the elastic arms face with each other.

3. The bus bar module according to claim 1, wherein the female lock portion includes an abutment surface against which the support plate portion of the male lock portion abuts in a state where the lock claw locks the locking frame.

4. The bus bar module according to claim 1, wherein the coupling portion is a first coupling portion provided between bus bar housing portions in which the bus bar is housed, wherein the case further includes a second coupling portion in which a male lock portion is engaged with a female lock portion between electric wire routing groove portions in which an electric wire is routed, wherein the second coupling portion is provided at a position adjacent to the first coupling portion in a width direction of the case, wherein the elastic arms space the support plate portion away from the end surface of the second divided case in the arrangement direction, and wherein the locking plate portion is located between the locking frame and the end surface of the first divided case in the arrangement direction, and the locking plate portion is located between the end surface of the first divided case and the locking claw in the arrangement direction.

5. The bus bar module according to claim 4, wherein in at least one of the first coupling portion and the second coupling portion, the female lock portion includes side walls facing each other and spaced apart in the width direction of the case, and the male lock portion is fitted between the side walls of the female lock portion.

6. The bus bar module according to claim 4, wherein the female lock portion includes an engagement recess formed by bottom wall, a first side wall that protrudes from the bottom wall, and a second side wall that protrudes from the bottom wall, a first locking claw that protrudes from the first side wall and toward the second side wall, the first locking claw is spaced away from the bottom wall, a second locking claw that protrudes from the second side wall and toward the first side wall, the second locking claw is spaced away from the bottom wall, and an engagement protrusion protruding from the bottom wall, and wherein the male lock portion of the second coupling portion includes an engagement plate portion that is fitted into the engagement recess and is located between the bottom wall and each of locking claws, and an engagement hole through the engagement plate portion, the engagement protrusion is inserted into the engagement hole.

7. The bus bar module according to claim 1, wherein a space extends from the support plate portion to the end surface of the second divided case.

8. The bus bar module according to claim 1, wherein the locking plate portion is spaced away from the both of the elastic arms in a direction that is orthogonal to the arrangement direction.

9. The bus bar module according to claim 1, wherein the locking claw is spaced away from the both of the elastic arms in the direction that is orthogonal to the arrangement direction.

10. The bus bar module according to claim 1, wherein each of the elastic arms extends from the end surface of the second divided case to a first one of the bending points in the arrangement direction, each of the elastic arms extends from the first one of the bending points to a second one of the second bending points in the direction that intersects the arrangement direction, and each of the elastic arms extends from the second one of the bending points to the end portion in the arrangement direction.

11. The bus bar module according to claim 1, wherein the slits pass through the support plate portion.

* * * * *